(12) United States Patent
Vahabi et al.

(10) Patent No.: US 10,796,239 B2
(45) Date of Patent: Oct. 6, 2020

(54) METHOD AND/OR SYSTEM FOR RECOMMENDER SYSTEM

(71) Applicant: Oath Inc., New York, NY (US)

(72) Inventors: Hossein Vahabi, Barcelona (ES); Francesco Gullo, Barcelona (ES)

(73) Assignee: Oath Inc., New York, NY (US)

( * ) Notice: Subject to any disclaimer, the term of this patent is extended or adjusted under 35 U.S.C. 154(b) by 709 days.

(21) Appl. No.: 14/836,692

(22) Filed: Aug. 26, 2015

(65) Prior Publication Data

US 2017/0061310 A1    Mar. 2, 2017

(51) Int. Cl.
| | | |
|---|---|---|
| G06N 7/00 | (2006.01) | |
| H04L 12/58 | (2006.01) | |
| G06N 5/04 | (2006.01) | |
| G06F 16/901 | (2019.01) | |
| G06F 16/2457 | (2019.01) | |
| G06N 5/00 | (2006.01) | |

(52) U.S. Cl.
CPC ....... *G06N 7/005* (2013.01); *G06F 16/24578* (2019.01); *G06F 16/9024* (2019.01); *G06N 5/003* (2013.01); *G06N 5/04* (2013.01); *H04L 51/32* (2013.01)

(58) Field of Classification Search
CPC .............................. G06F 17/30; H04L 61/1547
See application file for complete search history.

(56) References Cited

U.S. PATENT DOCUMENTS

| | | | | |
|---|---|---|---|---|
| 2009/0192809 A1* | 7/2009 | Chakraborty | .......... | G06Q 10/00 705/348 |
| 2012/0102130 A1* | 4/2012 | Guyot | .................... | H04L 51/12 709/206 |
| 2012/0259915 A1* | 10/2012 | Bhatt | ...................... | G06Q 50/01 709/204 |
| 2013/0080538 A1* | 3/2013 | McEachern | ............ | G06Q 10/10 709/206 |
| 2013/0246439 A1* | 9/2013 | Liekens | ............ | G06F 17/30958 707/748 |
| 2014/0237093 A1* | 8/2014 | Hofman | ............ | G06F 17/30861 709/223 |
| 2015/0019639 A1* | 1/2015 | Marlow | .................. | H04W 4/21 709/204 |
| 2015/0213020 A1* | 7/2015 | Marvit | .............. | G06F 17/30867 707/748 |

OTHER PUBLICATIONS

'Information Diffusion in Online Social Networks: A Survey': Guille, 2013, ACM.*
'A Predictive Model for the Temporal Dynamics of information Diffusion in Online Social Networks': Guille, 2012, MSND'12 workshop.*

(Continued)

*Primary Examiner* — Li B. Zhen
*Assistant Examiner* — Peter D Coughlan
(74) *Attorney, Agent, or Firm* — Cooper Legal Group, LLC

(57) ABSTRACT

Method embodiments and/or system embodiments are provided that may be utilized to recommend online content to users based, at least in part on a prediction of diffusion of online content through a social network.

22 Claims, 5 Drawing Sheets

Omitting online content from being recommended based on computation that members are more likely than not to view online content via a different source — 305

Recommending non-omitted online content to members based on predicted diffusion weight and/or member recommendation threshold value — 310

(56) References Cited

OTHER PUBLICATIONS

Amit Goyal et al.; "A Data-Based Approach to Social Influence Maximization", 38th International Conference on Very Large Data Bases, Aug. 27 31 2012, Istanbul, Turkey. Proceedings of the VLDB Endowment, vol. 5, No. 1, Copyright 2011 VLDB Endowment 2150809Jul. 11, 2009.

Adrien Guille et al.; "A Predictive Model for the Temporal Dynamics of Information Diffusion in Online Social Networks", WWW 2012 Companion, Apr. 16-20, 2012, Lyon, France. ACM 978-1-4503-1230—Jan. 12, 2004.

G. Salton et al.; "A Vector Space Model for Automatic Indexing", Communications of the ACM, Nov. 1975, vol. 18, No. 11.

Xiwang Yang et al.; "Bayesian-inference Based Recommendation in Online Social Networks", IEEE Transactions on Knowledge and Data Engineering.

Liangjie Hong et al.; "Co-Factorization Machines: Modeling User Interests and Predicting Individual Decisions in Twitter", WSDM'13, Feb. 4-8, 2013, Rome, Italy. Copyright 2013 ACM 978-1-4503-1869—Mar. 13, 2002.

Kailong Chen et al.; "Collaborative Personalized Tweet Recommendation", SIGIR'12, Aug. 12-16, 2012, Portland, Oregon, USA. Copyright 2012 ACM 978-1-4503-1472—May 12, 2008

Jure Leskovec et al., "Cost-effective Outbreak Detection in Networks", KDD'07, Aug. 12-15, 2007, San Jose, California, USA.. Copyright 2007 ACM 978-1-59593-609-7/07/0008.

Ye Pan et al., "Diffusion-aware Personalized Social Update Recommendation", RecSys'13, Oct. 12-16, 2013, Hong Kong, China. Copyright 2013 ACM 978-1-4503-2409-0/13/10.

Arijit Khan et al., "Fast Reliability Search in Uncertain Graphs" 17th International Conference on Extending Database Technology (EDBT), Mar. 24-28, 2014, Athens, Greece: ISBN 978-3-89318065-3.

Mayur Mohite et al., "Incentive Compatible Influence Maximization in Social Networks and Application to Viral Marketing", arXiv:1102.0918v2, cs.Gt, Feb. 7, 2011.

M. Gomez-Rodriguez et al., "Inferring Networks of Diffusion and Influence", ACM Trans. Knowl. Discov. Data 5, 4, Article 21, Feb. 2012.

Adrien Guille et al., "Information Diffusion in Online Social Networks: A Survey", SIGMOD Record, vol. 42, No. 2., Jun. 2013.

Kazumi Saito et al., "Learning Diffusion Probability based on Node Attributes in Social Networks", In ISMIS '11, pp. 153-162, 2011.

Wei Shen et al., "Linking Named Entities in Tweets with Knowledge Base via User Interest Modeling", KDD'13, Aug. 11-14, 2013, Chicago, Illinois, USA. Copyright 2013 ACM 978-1-4503-2174—Jul. 13, 2008.

Marco Pennacchiotti et al., "Making Your Interests Follow You on Twitter", CIKM'12, Oct. 29-Nov. 2, 2012, Maui, HI, USA. Copyright 2012 ACM 978-1-4503-1156—Apr. 12, 2010.

Yehuda Koren et al., "Matrix Factorization Techniques for Techniques for Recommender Systems", Published by the IEEE Computer Society 0018-9162/09, 2009 IEEE.

David Kempe et al., "Maximizing the Spread of Influence through a Social Network", SIGKDD '03 Washington, DC, USA. Copyright 2003 ACM 1581137370/, 03/0008.

Jure Leskovec et al., "Mining of Massive Datasets", 2014.

* cited by examiner

METHOD AND/OR SYSTEM FOR RECOMMENDER SYSTEM

BACKGROUND

1. Field

The subject matter disclosed herein relates to a method and/or system for recommending online content.

2. Information

Online social networks, such as Facebook and/or Google+, and real-time micro-blogging platforms, such as Twitter, Tumblr, Weibo and/or Instagram, have proliferated in the last few years. Increased user engagement, such as for social networks and/or micro-blogging platforms, may be correlated to increased revenue for the owner of an online social platform (as posted advertisements are more likely to be viewed and/or selected). In addition, if a user may be engaged via a connection to a social media platform, he or she may contribute feedback to the social network platform, which may be utilized for profiling and/or personalization purposes, for example.

Recommender systems typically generate targeted personalized recommendations to facilitate access that may be beyond a user's reach. A user or member may, in some cases, comprise an active entity that also generates additional online content (e.g., through likes, retransmissions, and/or forwards (e.g., retweets and/or reposts)). Current recommender systems may focus on specific users to which recommendations are made, which may be disadvantageous at times, and consequently may not be as focused on other users within a social network.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawing in which:

Figure 1:
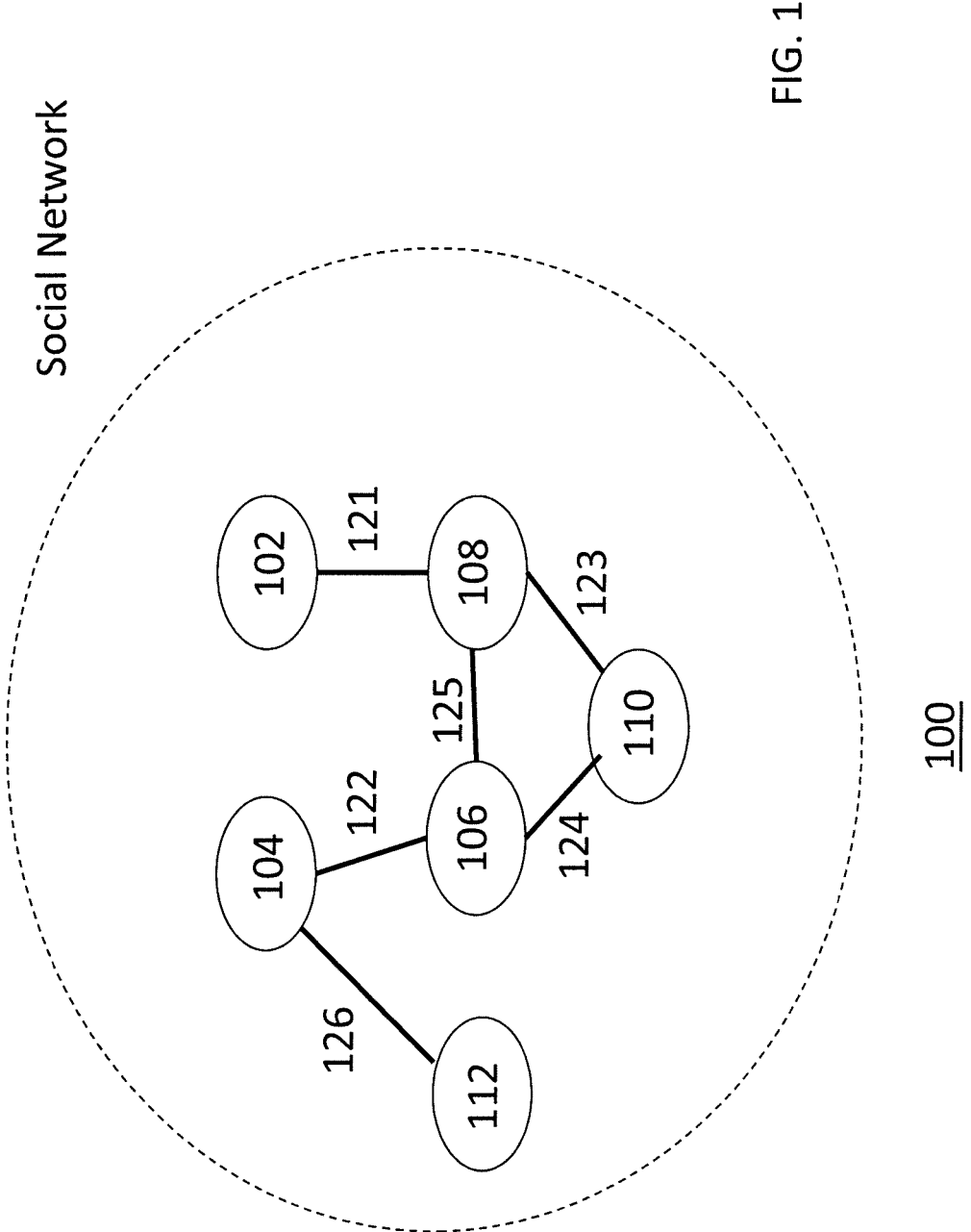
FIG. 1 is a schematic diagram of a social network graph according to an embodiment.

Reference is made in the following detailed description to accompanying drawings, which form a part hereof, wherein Ike numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

An example of a distributed computing system is the Hadoop distributed computing system, which employs a map-reduce type of architecture. In the context the terms map-reduce architecture and/or similar terms are intended to refer a distributed computing system implementation for processing and/or for generating large sets of signal samples employing a parallel, distributed process performed over a network of individual computing devices. A map operation and/or similar terms refer to processing of signals to generate one or more key-value pairs and to distribute the one or more pairs to the computing devices of the network. A reduce operation and/or similar terms refer to processing of signals via a summary operation (e.g., such as counting the number of students in a queue, yielding name frequencies). A system may employ such an architecture for processing by marshalling distributed servers, running various tasks hi parallel, and managing communications and signal transfers between various parts of the system, in an embodiment. As mentioned, one non-limiting, but well-known example, is the Hadoop distributed computing system. It refers to an open source implementation of a map-reduce type architecture, but may include other aspects, such as the Hadoop distributed file system (HDFS). In general, therefore, Hadoop and/or similar terms refers to an implementation scheduler for executing large processing jobs using a map-reduce architecture.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. In most contexts, "connected" is used generically to indicate that two or more components, for example, are in direct physical, including electrical, contact. In this context, "connect(s)" or "connection" refers to a logical or virtual association between two users or members of a social network, which is defined infra. "Connect" or "connection" also refers to direct and/or indirect communication between users or members of a social network. In this context, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes so as to be capable to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately compatible and/or compliant signal packets and/or frames. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms refer to any electronic file and/or electronic document, such as may be accessible via a network, including by specifying a URL for accessibility via the Web, in an example embodiment. As alluded to above, hi one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "entry", "electronic entry", "document", "electronic document", "content", "digital content", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format).

Likewise, in this context, content (e.g., digital content) provided to a user in a form so that the user is able to perceive the underlying content itself (e.g., hear audio or see images, as examples) is referred to, with respect to the user, as 'consuming' content, 'consumption' of content, 'consumable' content and/or similar terms, "Content may be also referred to as online content." For example, in embodiments, online content or an online content item comprises one or more of the following: a video; an image; a web page; an article; a product description; a service description; an advertisement; post, tweet, newsfeed, picture, video, or combinations thereof. These terms may be utilized interchangeably.

For one or more embodiments, an electronic document may comprise a Web page coded in a markup language, such as, for example, HTML (hypertext markup language). In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to content, such as content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

Signal packets and/or frames, also referred to as signal packet transmissions and/or signal frame transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or frame communicated via the Internet and/or the Web, for example, may be routed via a path comprising one or more gateways, servers, etc. that may, for example, route a signal packet and/or frame in accordance with a target and/or destination address and availability of a network path of network nodes to the target and/or destination address. Although the Internet and/or the Web comprises a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven layer approach and/or description. A network protocol refers to a set of signaling conventions, such as for computing and/or communications transmissions, as may, for example, take place between and/or among devices in a network, typically network devices; for example, devices that substantially comply with the protocol and/or that are substantially compatible with the protocol. In this context, the term "between" and/or similar terms are understood to include "among" if appropriate for the particular usage and vice-versa. Likewise, in this context, the terms "compatible with", "comply with" and/or similar terms are understood to include substantial compliance and/or substantial compatibility.

Typically, a network protocol, such as protocols characterized substantially in accordance with the aforementioned OSI description, has several layers. These layers may be referred to here as a network stack. Various types of transmissions, such as network transmissions, may occur across various layers. A lowest level layer in a network stack, such as the so-called physical layer, may characterize how symbols (e.g., bits and/or bytes) are transmitted as one or more signals (and/or signal samples) over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are compatible and/or compliant with a particular network protocol at these higher-level layers. For example, higher-level layers of a network protocol may, for example, affect device permissions, user permissions, etc.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerated if the remote device is power cycled, for example. Also, a VPN typically may affect a single remote device, for example, in some situations. A network may be very large, such as comprising thousands of nodes, millions of nodes, billions of nodes, or more, as examples.

Online social networks, such as Facebook and/or Google+, and real-time micro-blogging platforms, such as Twitter, Tumblr, Weibo and/or Instagram, have proliferated in the last few years. Increased user engagement, such as for social networks and/or micro-blogging platforms, may be correlated to increased revenue for the owner of an online social platform (as posted advertisements are more likely to be viewed and/or selected). In addition, if a user may be engaged via a connection to a social media platform, for example, he or she may contribute feedback to the social network platform, which may be utilized for profiling and/or personalization purposes, for example.

Recommender systems typically generate targeted personalized recommendations to facilitate access that may be beyond a user's reach. In some situations, for example, a user or member may comprise an active entity that also generates additional online content (e.g., through likes, retransmissions, and/or forwards (e.g., retweets and/or reposts)). Current recommender systems may focus on specific users to which recommendations are made, which may be disadvantageous at times, and consequently may not be as focused on other users within a social network, as shall be explained.

In this context, the terms recommender system, recommendation system, recommendation system embodiment, recommender system embodiment, recommendation services, recommendation application, online content recommendation tool, online content recommendation system and/or similar terms are, or maybe, used interchangeably. These and/or similar terms refer to a recommender system that may be employed in a client-server type interaction, such as a network device and/or a computing device, for example. In an embodiment, a recommender system may be for use in connection with rendering a GUI via a device, such as a client, for communication with a server, for example. A recommender system may also be part of a portion of a distributed computing system. In an embodiment, a computing device may interface with a client, which may comprise features of a client computing device, for example. A communications interface, a processor, and a memory may communicate by way of a communication bus, for example. In an embodiment, a client computing device may communicate with a computing device by way of a connection, such as an internet connection, via a network, for example. Examples are provided merely as illustrations. It is not intended that claimed subject matter limited in scope to illustrative examples.

In a general context, social networking is a practice of expanding the number of a user's business and/or social contacts by making connections through individuals or users. In a general context, a social network is a group of individuals that are in direct or indirect communication with other individuals associated with a group. However, in this context, a "social network" comprises and/or refers to users that are logically connected, directly and/or indirectly, to other users, in a network (e.g., computing and communications network). In this context, users that are logically connected may directly communicate other users via a network utilizing transmissions, such as emails, texts, online content, and/or messages. In an embodiment, users may communicate indirectly through retransmissions, forwards, and/or transfers of emails, texts, messages, and/or online content. Users in a social network may be referred to as "members." In this content, terms "users" and "members" may be used interchangeably. A social network, for example, may be established via software applications and/or web sites, such as Tumblr, Facebook, Twitter, Instagram, LinkedIn, etc. A social network may include a plurality of members, e.g., hundreds, thousands, millions, or billions of members.

In an embodiment, a social network may comprise at least two members. In an embodiment, members may have joined a social network and/or be invited to join a social network. In an illustrative embodiment, for example, in social network Facebook®, a user may join Facebook® by creating a profile on a Facebook® mobile software application downloaded onto a user's computing device. Alternatively, a member may create a profile on a Facebook® web site.

In this context, "members" refers to users, followers, and/or entities in a social network that form an association with one or more users, followers, and/or entities in a social network which results in online content, that is received or requested by a member, for example, being forwarded and/or shared with another member. In an embodiment, in a social network, such as, Twitter®, Instagram®, Tumblr®, associated members may be referred to a "followers." In an embodiment, in a social network, such as, Facebook, associated members may be referred to as "friends." In an embodiment, in a social network, such as LinkedIn, associated members may be referred to as "connections." All of the foregoing comprise examples of members in this context. In addition, examples of "members" and "associated members" are described below.

For example, a member may comprise an active entity that may generate online content by, for example, expressing opinions about various online content (e.g., through likes of posts, tweets, videos), including, as examples, forwards, shares, or retransmissions of viewed online content to other users (e.g., re-tweets or re-posts).

In an embodiment, within a social network, "associated members" refer to members that are logically associated and/or logically connected with other members. In an embodiment, if members are "associated," a member may directly or indirectly communicate with an associated member via a computing, communication, and/or carrier network. In an embodiment, members may be associated with other members via voluntary elections or responding to communications from other members.

In this context, "social network graph" refers to a subnetwork of a larger social network, such that subnetwork members are capable of or in direct and/or indirect communication with other members. In an embodiment, users or members in a social network graph may be represented, for purposes of the present application, by "nodes," and associations and/or connections with other members may be represented by "edges" and/or "links" that may represent relationships and/or interactions among associated members. "Edges," "links," and/or similar terms, may be utilized interchangeably. In an illustrative embodiment, an edge may connect two nodes in a social network graph, if nodes are associated by a relationship (e.g., a friend, a follower, a connection, such as ones that may characterize a specific social network, for example).

For example, FIG. 1 illustrates a schematic diagram of a social network graph according to an embodiment 100. In an embodiment, social network, such as 100, may comprise one or more members, such as 102, 104, 106, 108, 110, and 112. In an embodiment, members may have joined a social network and/or be invited to join a social network embodiment, such as 100.

In an embodiment, such as illustrated in FIG. 1, members 102 and 108 may be directly associated, as illustrated by edge 121; members 104 and 106 may be directly associated, as illustrated by edge 122; members 108 and 110 may be directly associated, as illustrated by edge 123; members 106 and 110 may be directly associated, as illustrated by edge 124; and members 104 and 112 may be directly associated, as illustrated by edge 126. In an embodiment, as illustrated in FIG. 1, members 102 and 110 may be indirectly associated, as shown by following a path comprising edges 121 and 123 from member 102 to member 108 to member 110. Further, as illustrated in FIG. 1, members 104 and 110 may be indirectly associated, as shown by following a path comprising edges 122 and 124 from member 104 to member 106 to member 110.

In an embodiment, users and/or members of a social network may become associated, such as by invitation, requests, and/or elections. For example, in social network Facebook®, members may invite other members to be "friends" via, for example, a "friend request." If members in Facebook® become friends, content or online content posted by one member may be shared, retransmitted, and/or forwarded to a Facebook® friend (e.g., an associated member). In Instagram®, Tumblr®, and Twitter®, associated members may be referred to as "followers." In social networks such as Instagram®, Tumblr®, and Twitter®, members may be associated with another member by "following" another member. In an embodiment, social networks, such as Instagram®, Tumblr®, and Twitter® members may select to "follow" another member and a "followed" member may not have to initially agree to be followed. "Followed" members may "block" a follower, which may disassociate a member from another member. In an embodiment, members of a social network may have to agree to have another member associate with them. In a social network such as LinkedIn®, members may become associated through a connection request. A variety of approaches are possible and intended to be included within claimed subject matter.

In this context, "diffusion" or "social network diffusion" refers to a rate or measure of online content or content distribution, such as forwarding and/or retransmission among members of a social network. In an embodiment, a rate or measure of online content forwarding and/or retransmission may comprise an approximate measure. Terms "share," "sharing," "forward," "forwarding," "retransmit," "retransmitting," or other similar terms, may be utilized interchangeably. Referring back to FIG. 1, in an embodiment, if online content, such as a video, is recommended to member 102, this online content may also be forwarded to associated members (e.g., members directly associated with member 102, such as member 108, or indirectly associated with member 102, such as members 106 or 110). In an embodiment illustrated in FIG. 1, online content may be directly forwarded and/or retransmitted to member 108. Depending, at least partially, on diffusion parameters (e.g., retransmission characteristics in a social network graph such as a number of times online content may be retransmitted), online content may also be retransmitted from member 108 to members 106 and/or 110. Further, in an embodiment, online content, originated, in this example, at member 102 may also be forwarded and/or retransmitted from member 106 to member 104. Again, a variety of approaches are intended to be included within claimed subject matter.

In an embodiment, "diffusion path length" or "path length" refers to a number of members, links, and/or edges through which online content may be forwarded and/or retransmitted. Likewise, in an embodiment, "distance" or "path distance" refers to a number of members, links, and/or edges through which online content has been and/or may be forwarded and/or retransmitted. Of course, path length or path distance may be measured in a variety of ways within claimed subject matter.

Accordingly, in an embodiment, such as illustrated in FIG. 1, online content may be retransmitted from member 102 to member 108 (through a path comprising edge 121) and then to member 110 (through a path comprising edge 123) and then to member 106 (through a path comprising edge 124). In this example embodiment, a path length (or diffusion path length) in a social network graph for this online content may comprise three (3). In an embodiment, online content retransmitted in a social network graph from member 104 to member 106 (through a path comprising edge 122) to member 110 (through a path comprising edge 124) may have a diffusion path length of 2 (e.g., two edges).

Recommender systems may recommend online content to users or members of a social network. In an embodiment, online content may be forwarded and/or retransmitted from an associated member of a member's social network. Instead, in an embodiment, a recommender system may review a user or member's search history or web page viewing habits and recommend online content to a user member.

In an embodiment, diffusion via a social network graph may increase user or member engagement. In this context, an edge (i, j) in a social network may comprise an edge between associated members i and j (e.g., if member j follows i). If member j is associated with member i, member j may view online content retransmitted (e.g., re-tweeted) by member i. If online content is retransmitted, and/or recommended to member i, online content may potentially increase member i's engagement with Internet-type applications and/or a social network, for example, especially if online content is interesting to a member. Continuing with this illustrative embodiment, if online content is diffused further, e.g., through additional retransmissions (e.g., posts and/or retweets) to members that may be associated with members associated with i and/or j, for example, forwarded online content may increase engagement of members that may be associated with members i and j. For example, in an embodiment, three levels of associated members exist if member j is associated with member i, member k is associated with member j, and/or member l is associated with member k. In an embodiment, for example, online content (e.g., a post) may be diffused to two levels of associated members if a post is first retransmitted from member i to member j and then retransmitted from member j to member k. However, current recommender systems may not take into consideration, or may even overlook, social network diffusion.

Duplicate receipt of online content by members of social networks may result in less efficiency. In an embodiment, online content in a social network may be recommended to member i and then also may be retransmitted (e.g., reposted) to member j. Illustratively, in an embodiment, similar online content may also be recommended directly, either by a same source or a separate source, to member j. In this illustrative example, associated members (e.g., followers and/or friends) may receive online content through a retransmission as well as a direct recommendation. In an embodiment, recommender systems may have a limited number of recommendation slots or spaces for online content for a number of reasons, such as memory or storage considerations, for example. A limited number of recommendation slots or spaces for a member in a recommender system may also be based, at least in part, on numbers of members. If a social network has a high number of users, a social network and/or recommendation system may utilize more computational time and/or storage space. If members receive online content directly, and/or also indirectly, such as through a retransmission and/or forwarding of online content (e.g., a repost and/or retweet) resources of a recommender system, such as online resources, may be expended on duplicate online content (e.g., tweets and/or retweets) that may have otherwise already reached associated members (or may otherwise reach them at a later time). A recommender system may expend excess resources with hundreds, thousands, or millions of associated members (e.g., followers or friends), and if duplicate online content is received by associated members, for example.

Accordingly, in an embodiment, a recommendation system that takes into account diffusion in a social network may potentially improve user engagement and/or recommender system performance, such as more efficient use of memory and/or processor resources. As shall be described in greater detail, in an embodiment, a recommender system may omit, from being recommended, online content to members in an online social network, based at least in part, on an estimate that one or more members may be more likely than not to view online content via a different source. In addition, in an embodiment, a recommender system may recommend non-omitted online content to users based at least in part on predicted diffusion of online content via a social network. Continuing with an illustrative embodiment, a recommender system may also recommend non-omitted content to members until a number of recommendations exceeds a threshold number of recommendations.

In an illustrative embodiment, online content may be diffused to multiple social network users or members through retransmissions. This may potentially lead to increased user engagement, based at least in part, on exposure to multiple pieces of online content. However, recommender systems, at a present time, may not, or typically may not, identify online content diffusion via a social network. An estimate of whether or not users may be more likely than not to otherwise receive, or have received online content may be based, at least in part, on a prediction of diffusion of online content via a social network.

System embodiments may predict diffusion of online content in a social network utilizing different techniques and/or approaches. In an embodiment, a prediction of diffusion may, for example, be based, at least in part, on factors such as: online content retransmission probability, a number of successive forwards and/or retransmissions, "distance" (e.g., measured in a variety of ways) from a source online content in a social network graph, and/or online content relevance to members or users. For example, a prediction of diffusion may be based, at least in part, on a system generating a set of members that are reachable from a source or an initiating node (e.g., corresponding to a member) in a majority of social network graphs. In this context, a "majority of social network graphs" refers to a situation where, forwarded online content may reach a set of members in a social network graph more than a preset number (e.g., 50% or more) of times. In an embodiment, a recommender system may identify groups (e.g., sets) of members (e.g., nodes) that an initiating member may communicate with, either directly or indirectly. In a social network graph, such as FIG. 1, for example, this may be illustrated as members that may be connected via edges, either directly or indirectly.

In another embodiment, prediction of online content diffusion may be based, at least in part, on generating a set of associated members with a path distance from an online content source member which is less than a threshold retransmission distance. For purposes of the present application, a "threshold retransmission distance" refers to a largest number of edges and/or links that online content may be distributed from a source or initiating node in a social network graph. In an embodiment, if a threshold retransmission distance for online content is two (or two members or nodes), then online content may not be retransmitted past two edges. For example, in an embodiment illustrated in FIG. 1, for example, online content retransmitted from member 104 may be retransmitted two times (e.g., from member 104 to associated member 106 and then to associated member 108). However, member 108 may not retransmit received online content to associated member 102 and/or associated member 110 because a threshold retransmission distance has been exceeded (e.g., more than two edges or members in an example environment). For example, in an embodiment, if a threshold retransmission distance is three members or edges, a system may generate a set of members that are less than three edges or members from a source member.

In another embodiment, a prediction of online content diffusion may be based, at least in part, on generating a set of online content that has a greater probability than a threshold retransmission probability. In an embodiment, a threshold retransmission probability may be based, at least in part, on a member specific retransmission probability and/or distance from an originating node (e.g., member) for online content. In an embodiment, a member specific retransmission probability may be calculated and/or estimated by supplying a member with a number of online content items and measuring a number of online content items that a member shared, forwarded and/or retransmitted. In an embodiment, in a social network, online content may be limited in terms of a number of times online content may be forwarded and, thus, a further number of edges away a node is from an originating node, a lower probability may exist that a node receives retransmitted online content from an originating node.

As noted previously, a recommender system may utilize a social network graph to identify and/or capture relationships, associations, and/or connections between members. In an embodiment, a system may have a set U of N users that may be connected in a social network graph (G=(V, E)). In this context, connections refer to logical associations between users in a social network. In this embodiment, V=|U| and E comprises a series of directed edges. For example, a directed edge (i,j) $\in$ E may exist between members i and j, if j may be associated with i and, thus, views online content generated or retransmitted (e.g., re-posted) by i. In an embodiment, for example, Fi comprises a set or group of members that is associated with i (e.g, Fi={j:(i,j) $\in$ E}) and $G_i$ comprises a group of members with which i is associated (e.g., $G_i$={j: i $\in$ Fj}).

In an embodiment a social network member may receive online content, in a variety of ways, such as through one or more recommended online content items provided by a recommendation system to member i; and/or through retransmissions and/or forwards from associated members (e.g., retweets, re-posts). In an illustrative embodiment, a system may generate recommended online content and/or a recommendation list for a member. For example, $L_i$ refers to recommended online content items (or a recommendation list) for member i, S refers to a set of online content (e.g., posts and/or tweets) present in a system at a present time (e.g., online content that has been generated in the past); and U comprises a group of members. In this context, a "recommendation list" comprises a number of online content items a recommender system assigns to a member of a social network. "Recommendation list," "recommendations," "number of recommendations," "recommendation items," "recommendation entries," and/or other similar terms may be utilized interchangeably.

In an embodiment, an online relevance factor ($r_{it}$) for an online content item may identify relevance of online content item t for member i. Illustratively, a relevance factor may identify a degree to which an online content item t may likely be of interest to member i. A relevance factor of t may be calculated, for example, by comparing aspects of online content t to a history of online content a member has viewed, generated, forwarded, and/or retransmitted in a time window.

In an illustrative embodiment of a recommender system, a member may have a threshold of at most K online content items that a system may recommend. This may be referred to as recommendation threshold and may be represented by |Li|=K. In this illustrative embodiment, K may comprise less than a total set of online content items S (e.g., posts), which may be represented by K<<|S|.

Continuing with an example embodiment, a recommender system may compute an engagement or engagement factor of member i for a social network as a relevance value of online content items t displayed to a member through a recommendation list. In an embodiment, an engagement factor may be correlated to a relevance factor. For example, in an embodiment, $e_{it}=r_{it}$, (e.g., in an embodiment, an engagement factor may be estimated using a relevance factor as a structured "best guess", although other types of estimates are contemplated within claimed subject matter).

In an embodiment, a recommendation system may potentially increase member engagement by recommending online content that may be relevant to a member. Continuing with an illustrative embodiment, a member retransmission probability may depend, at least in part, on a member's profile as well as relevance of online content to a member. For example, in an embodiment, a member-specific probability of retransmission (e.g., reposting) may be referred to as w.

As discussed above, online content may be received or requested via recommendation and/or also via retransmission and/or forwards. In an embodiment, if online content is recommended to a social network member, online content may potentially impact member engagement. In addition, in an embodiment, online content may also potentially indirectly impact other associated members' engagement for example, recommended online content may be retransmitted to other social network members. Thus, recommendation of online content may result in diffusion in a social network graph.

In an embodiment, a recommender system may predict (e.g., estimate) diffusion in a variety of manners. Illustratively, in embodiments, a recommender system may utilize different diffusion techniques and/or approaches, to estimate online content diffusion via a social network. In an embodiment, a recommender system may also determine and/or calculate engagement potential of online content t in a social network graph, after t is initially recommended to user i.

In an embodiment, a recommendation system may utilize member-specific retransmission probability and generate a probabilistic graph $G^i$, where edges $(i,j) \in E$ may occur with a member-specific retransmission probability $w_i$. In an embodiment, a recommendation system may generate a set of nodes (which correspond to members) reachable (or at least potentially or believed to be reachable) from node i in a majority of social network graphs. In this context, a probabilistic graph comprises a social network graph comprising edges (or paths between members) with assigned member-specific retransmission probability values. In an embodiment, illustratively, if online content t is recommended to member i, member j is considered reachable from i if a path exists between i and j. In an illustrative embodiment, a probability of existence of a path comprises a product of retransmission (repost) probabilities of nodes (e.g., representing members) across a path except for j. Continuing with an illustrative embodiment, a recommender system may generate a reliable node set (e.g., $R_i$) for member i, which may be utilized to compute engagement potential for online content t. In this context, a "reliable node set" $R_i$ comprises a group and/or number of nodes which are reachable from member i with a probability greater than a threshold probability n. In this context, $e_{jt}$ refers to an engagement factor for online content t and member j. In this context, $E^I_{it}$ represents an engagement potential for online content t if recommended to member utilizing a diffusion technique I. Thus, in an example embodiment, a recommender system may generate an engagement potential for online content t which is recommended to member i substantially in accordance with the following:

$$E^I_{it} = \sum_{j \in Ri} e_{jt}$$

In this context, Σ refers to summing a number of online content items and as shown above here, in particular, summing engagement factors for members j in a reliable node set. In an illustrative embodiment, a reliable node set ($R_i$) of i may be estimated utilizing Monte Carlo sampling. In this context, Monte Carlo sampling refers to choosing a large number of independent-variable samples at random from within an interval or region, and averaging, including weighted averages, the resulting dependent-variable values. Thus, dividing by a span of an interval or a size of a region over which random samples were chosen may also be employed in some situations. In Monte Carlo sampling, a recommendation system embodiment may sample a set D of deterministic graphs from an original (e.g., initial) probabilistic graph P by considering edge probabilities and, for deterministic graphs, a recommendation system embodiment may calculate and/or compute a set of nodes reachable from node i, which comprises a reliable node set (Ri). For example, in an illustrative embodiment, a recommender system embodiment may compute Ri in an amount of time, proportional to O(|D|(|V|+|E|)).

In this context, a "diffusion subgraph" comprises a section or subnetwork of a social network graph identifying paths, links, and/or edges and nodes (e.g. members) to which online content may be retransmitted, or forwarded. Utilizing a second technique for predicting diffusion of online content in a social network, in another embodiment, a recommender system may recommend online content t to member i and a member may retransmit t to create a diffusion subgraph $G^{II}_i$ whose source node is member i. Thus, in an example embodiment, a recommender system may retransmit online content to an associated member. However, in an embodiment, a recommender system may limit a retransmission of online content to a consecutive number of times, e.g., r number of times. Further, in an illustrative embodiment, r may reflect that relevance of online content may decrease, such as, linearly or exponentially with time, and that retransmissions (e.g., reposts) of online content may consequently cease after a specified number of times.

In an embodiment, a diffusion subgraph $G^{II}_i$ may include nodes (e.g., corresponding to members) j for which a shortest path from member i to member j is at most r. In this context, an engagement potential for online content t initially recommended to member i comprises a sum of engagement factors for nodes in a diffusion subgraph $G^{II}_i$. In this context, $e_{jt}$ refers to an engagement factor for online content t and member j. In this context, $E^{II}_{it}$ comprises a value for an engagement potential for online content t if recommended to member i utilizing a diffusion technique, e.g., a diffusion technique such as described immediately above. In this context, $j \in G^{II}_i$ refers to users j in a diffusion subgraph. Thus, in an illustrative embodiment, a recommender system may generate an engagement potential for online content t initially recommended to member i substantially in accordance with the following:

$$E^{II}_{it} = \sum_{j \in G^{II}_i} e_{jt}$$

In an embodiment, a summation above (e.g., Σ) comprises summing engagement factors for users j in diffusion subgraph $G^{II}_i$. In an example embodiment, member j receive online content through several members that member j is associated with (e.g., is a "follower" of, is "friends" with). However, a recommender system embodiment calculating engagement potential may count a member a single time, and not multiple times, so as to not skew an engagement potential as a result of same or similar online content being received from a number of members, for example.

In yet another embodiment for predicting diffusion, a recommender system embodiment may forward online content viewed by member i to members j as long as a retransmission (re-post or retweet) probability $w_j$ of members exceeds an online content retransmission threshold Θ. For example, a retransmission probability for node (e.g., corresponding to a member) j may comprise $w_j f(r)$ where f(r) comprises a non-increasing function of distance r and $w_j$ comprises member j's specific retransmission (e.g., re-post and/or retweet) probability. In an illustrative embodiment, a shortest path from a source (e.g., initiating) member to member j comprises r. Thus, for example, if a member is at distance r from a source (e.g., initiating) member, and a retransmission probability is less than threshold Θ, a recommendation system embodiment, as is discussed previously, may not further forward online content. Continuing, a recommender system embodiment may generate a directed subgraph $G_i^{III}$ whose source member comprises member i. In an embodiment, an engagement potential for online content t comprises a sum of engagement factors for members in subgraph $G_i^{III}$. In this context, $E^{III}_{it}$ comprises a value for an engagement potential for online content t if recommended to member i utilizing another diffusion technique, e.g., a diffusion technique, such as described immediately above. In this context, $j \in G^{III}_i$ refers to members (or users) in a diffusion subgraph discussed immediately above. Thus, in an illustrative embodiment, a recommendation system embodiment may generate an engagement potential for online content t recommended to member i in accordance with the following:

$$E_{it}^{III} = \sum_{j \in G_i^{III}} e_{jt}$$

In an embodiment, a summation above (e.g., Σ) comprises summing engagement factors for users j in diffusion subgraph $G^{III}_i$.

In an embodiment, a recommendation system may generate recommendations to social network members by predicting (e.g., estimating) diffusion of online content in a social network. In an embodiment, a recommendation system may provide recommendations to increase member engagement by not recommending online content that may be expected to otherwise reach social network users through diffusion. For example, if an online content item is recommended, by a recommendation system embodiment, to a member without taking into account social network diffusion, similar online content could be recommended, by a recommender system embodiment, to one or more users that may have already received (or may later receive) similar online content through diffusion. This may result in redundancy and/or less efficiency in online content avocation since members may receive online content through retransmission as well as directly through recommendation. However, in an embodiment, if care is taken so that members who may likely receive online content through retransmission do not receive recommendations from a recommendation system embodiment for similar online content, social network members may potentially have higher user engagements. In an embodiment, a recommender system may generate a set of online content items for members, so as to increase user engagement. Accordingly, in an embodiment, a recommendation system may potentially increase user engagement by taking into consideration that a limited number of recommendations may be made due to system resources (e.g., space in memory and/or processing resources) and that similar online content may not be assigned to members linked by an edge, for example, in a social network graph.

In an embodiment, a recommendation system may initially identify a selected group of members to increase online content diffusion and/or user engagement. In this context, a "selected group" or a "selected set" refers to members that a recommender system identifies as having characteristics desirable for improved content diffusion. For example, a "selected group" of members may have characteristics, such as, members having no associated members and/or members having a high diffusion rate (e.g., a high number of associated members). "Selected set," "selected group," "selected member group," "selected member set," "independent member set," "independent member group," "selected set of members," "selected group of members," and/or other similar terms, may be used interchangeably. In an embodiment, a recommendation system to increase online content diffusion may not assign and/or recommend similar online content to two or more members if two or more members are associated members because associated members would likely already receive online content through a retransmission.

Continuing with an illustrative embodiment, a recommendation system may not generate a selected group of members to include two or more members that are "associated members" because online content recommended to one member may be forwarded and/or retransmitted to an "associated member." For example, in an embodiment, in a social network graph $G_n$ ($V_n, E_n$), $V_n$ may represent members (nodes) and $E_n$ may represent edges (e.g., links and/or associations). In a social network graph, members i and j may be associated, for example, if node j belongs in a diffusion subgraph of member i. For example, a recommendation system embodiment may not assign and/or recommend similar online content to two members (e.g., i and j) if connected nodes are linked by an edge in a social network graph (e.g., or are associated, such as "friends" in Facebook; "followers" in Tumblr, Instagram, and/or Twitter; and "connections" in LinkedIn, etc.).

A recommendation system embodiment may recommend online content t to member i. In an embodiment, recommendation of online content t to member i may be represented as $x_{it}$. In an illustrative embodiment, just as an example, an online content recommendation $x_{it}$ may be assigned a value of 1 if $x_{it}$ is recommended, or may be assigned a value of 0 if $x_{it}$ is not recommended.

Continuing with an illustrative embodiment, a recommendation system may potentially increase user engagement within a social network graph, such as by implementing constraints such as a) a limited number (K) of online content (e.g., posts) being assigned and/or recommended to a member (based, at least in part, on limited resources in an recommender system) and/or b) online content not being assigned and/or recommended to any nodes (e.g., members) that are linked with an edge in a social network graph, (e.g., cannot assign similar online content to associated members).

In this context, "max x" may refer increasing a measurement of user engagement. In this context, $$\sum_{i=1}^{N}$$

comprises summing and/or calculating for members i through N. In this context, $$\sum_{t \in S} E_{it} x_{it}$$

comprises a product of an engagement factor $E_{it}$ (e.g., engagement factor for online content t for user i) and recommendation $x_{it}$ (e.g., which may be set as a value of 0 or 1) summed for online content items t in a group of S posts.

Thus, in an example embodiment, a recommendation system may potentially increase user engagement for online content t recommended to member i substantially in accordance with the following:

$$\max_x \sum_{i=1}^{N} \sum_{t \in S} E_{it} x_{it}$$

subject to constraints, substantially in accordance with the following:
Constraint (a)

$$\sum_{t \in S} x_{it} = K,$$

which references that a number of online content recommendations made to a member is bounded and/or limited by number K.
Constraint (b), $$x_{it} + x_{jt} \leq 1, \forall (i,j) \in E_n, \forall t,$$

which references that similar online content (e.g., $x_{it} + x_{jt}$) may not be assigned (e.g., recommended) to nodes (e.g., members) if nodes are linked with an edge. In other words, if members are associated, then online content t is not to be assigned to both members i and j. For example, if similar online content was assigned to members i and j, $x_{it}$ and $x_{jt}$ would both be set to 1, the sum $x_{it} + x_{jt}$ would be greater than 1, and, therefore, would exceed this constraint.

However, computing and/or generating a selected group of members may be resource intensive and may, consequently, not be practical and/or technically feasible under some circumstances. In an embodiment, a recommendation system may determine or compute engagement weights for online content item t (e.g., post) by, determining possible member sets, and by computing engagement weights for those possible member sets, and, thus, identify an selected member set $X_i$, with an increased engagement weight. For example, in an embodiment, a selected member set $X_i$ may comprise a relatively high engagement weight relative to other member sets. Thus, in an embodiment, a recommendation system determining a potential engagement weight in this manner, may consume significant time and/or resources in performing such a calculation and/or determination based at least at part on calculations being performed to identify a member set with an increased engagement weight. Accordingly, a different method or process may be desirable to more efficiently utilize recommendation system resources.

In an embodiment, a recommendation system may utilize a process (e.g., denoted IS ($G_n$,t)) to more efficiently utilize recommendation system resources and to identify a selected set of members $X_i$ with a relatively high potential engagement weight. In an embodiment, process IS($G_n$,t) may receive neighborhood graph $G_n$ and online content t (e.g., post), and may generate a selected set of members $X_i$ of weight $WX_i$.

In an embodiment, for example, a recommendation system may sort members (e.g., nodes) in a decreasing order using one or more parameters for ordering, for example. In an embodiment, for process IS($G_n$, t), a recommendation system may likewise parse members (e.g., nodes) sequentially in a forward direction without performing backwards corrections even if parsing order is not precisely correct. This may reduce recommendation system resources (e.g., computational time expended).

Continuing with an illustrative embodiment a recommendation system may arrange members (e.g., nodes) in a decreasing order by a ratio of engagement weight compared to "out-degree" (e.g., $E_{it}/(1+d_i)$), where engagement weight is determined by a particular diffusion approach for the particular embodiment. In this context, $d_i$ refers to a member (e.g., node) "out-degree" of a member (e.g., node). In terms of a graph, "out-degree" comprises a number of linked nodes that a node has in a social network graph. In other words, in an embodiment, "out-degree" refers to a number of associated members for a particular member.

Continuing with an illustrative embodiment, in process IS($G_n$,t), a recommendation system may increase engagement weight by selecting members, for a selected member set, with large engagement weight (e.g., members for which recommendation of online content t could lead to increased diffusion of online content into a social network) and/or selecting members, for a selected member set, with a small out-degree (e.g., members which may not receive online content through diffusion). In other words, a recommender system embodiment may select a member (e.g., node) to be in a selected group of members (e.g., $X_i$) if selecting the member increases the number of associated members of the selected group so that online content may be diffused through retransmission and/or forwarding (e.g., diffused to a large number of associated members). Additionally, a recommender system embodiment may select a member with a small out-degree to be in selected group of members $X_i$ because selecting the member with a small out-degree indicates the member (e.g., node) likely may not have received online content through retransmission and/or forwarding.

Continuing with an illustrative embodiment, in process IS($G_n$,t), a recommendation system may also remove members (e.g., nodes) from selected group of members $X_i$. In an embodiment, a recommendation system may remove members that may, more likely than not, receive online content through diffusion (e.g., retransmission and/or forwarding). In an embodiment, in terms of a graph, $F_i$ comprises a set of nodes linked to node i (e.g., members that are associated with member i). In an embodiment, such as social network Facebook, $F_i$ may comprise "friends" of user i and in social network Twitter and/or Instagram, $F_i$ may comprise "followers." For example, in an embodiment, if a member i is included in a selected group of members $X_i$, members that are associated to member i may be removed from a selected group of members, such as $X_i$, and in addition, in terms of a graph, outgoing links of nodes in $F_i$, (e.g., i's out neighbors, "associated members," "friends," and/or "followers") may be removed from selected group of members $X_i$. In other words, in an embodiment, a recommendation system may prioritize members that have potential to increase diffusion of online content, such as members that may increase retransmission (e.g., repost), and/or members with small out-degree (e.g., for a graph, nodes that do not have a large set of conflicting neighbor nodes to which similar online content (e.g., posts or tweets) may be assigned).

For the discussion below of the graphs of FIGS. 2A and 2B and for the pseudocode descriptions, nodes comprise members, links comprise associations, and recommendation of online content comprises assignment to a node, such as has been described previously. Thus, without loss of generality, terms may be interchanged below for purposes of discussion and/or comprehension. Thus, as example, the term 'nodes' may be used to refer to members, the terms "links" may be used to refer to associations between members, etc. In an embodiment below, process IS($G_n$,t) is illustrated in pseudocode. In an illustrative embodiment, recommendation system may generate a selected member set and/or group of nodes and/or members (e.g., $I_t$) so as to increase member engagement weight. In this context, an engagement weight (e.g. relevance) of a selected group of nodes may be represented by $W(I_t)$. In an embodiment, a group of nodes $I_t$ may be identified for online content t recommended to member i substantially in accordance with a following process or method:

Input Variables: Social network graph Gn, online content t, engagement weight Eit $\forall i \in$ Vn.

Output Variables: Selected Member Group It for post t of weight W(It). Post t is recommended to members i $\in$ It.

```
Initialization: It ← ∅ ; W(It) = 0 ; V 'n← Vn ; E'n ←En.
    Sort nodes i in decreasing order of Eit/(1 + di).
    While Vn= ∅ do
        Examine nodes i ∈ Vn in the order they are sorted above.
        if It ∪ {i} is an independent set then
            It ← It ∪ {i}
            W(It) ← W(It) + Eit
            Vn ← Vn \ {i} \ Fi
            En ← E'n \ {(i, j) ∈ En : j ∈ Fi}
        end if
    end while
```

Continuing with an illustrative embodiment, a recommendation system may generate a selected group of members (e.g., $I_t$) and may generate K online content items (e.g., posts) to recommend to a member i. In an embodiment, a recommendation system may order (e.g., arrange or sort) K online content items in a decreasing order of engagement weight and/or relevance, e.g., $w(I_t)$. In an embodiment, for example, K online content items may be arranged from a higher engagement weight to a lower engagement weight. Continuing with an illustrative embodiment, a recommender system may assign online content items to a selected group of members in a decreasing order of weight. In an embodiment, a recommender system may assign online content to members until an agreed-upon number, or a threshold number of online content items, has been reached. In another embodiment, a recommender system may assign online content until a selected group of members (e.g., $X_i$ or $I_t$) is exhausted, and therefore, may not receive additional online content. An overall time for generating and sorting posts, according to the process embodiment outlined immediately above, for example, may be computed in an amount of time, proportional to O(|S|(|Vn|+|En|+log |S|)). In an embodiment, computing time may be measured by the time to: (i) execute a process IS ($G_n$,t) to generate of a selected group of members for online content (e.g., where t is a post in a group of posts, e.g., t $\in$ S), which may consume a duration that is linearly proportional, for example, to a size of a neighborhood graph, and (ii) execute a procedure to sort online content (e.g., posts) in S.

Likewise in an example embodiment, a process for generating recommendations or a recommendation list is illustrated in pseudocode below. In an embodiment, a system may potentially generate recommendations resulting in higher potential engagement for a group of members in accordance with the following:

Input Variable Set U(=Vn) of users/members, set S of posts, social network graph Gn, Engagement metric Eit $\forall i \in$ Vn, $\forall t \in$ S.

Output Variable: Recommendation of a group Li of K posts for each user i.

```
Initialization:
    For i ∈ Vn do
        Li ← ∅
    end for
    Vn ← Vn ; S' ← S
    for t ∈ S do
        IS(Gn, t)
    end for
Sort posts t in decreasing order of IS weight W(It)
    while Vn 6= ∅ and S' 6= ∅ do
        Consider posts t in the order they are sorted above
        for i ∈ It do
            Li ← Li ∪ {t}
            if |Li| = K then
                Vn ← Vn \ {i}
            end if
        end for
        S' ← S' \ {t}
    end while
```

As an illustration of how diffusion in a social network may potentially increase relevance and/or member engagement, a recommendation system embodiment may operate in accordance with the following. In an illustrative embodiment, assume a social network comprises two members, e.g., members 1 and 2. In this embodiment, a recommendation system may generate a recommendation or recommendations for members. For purposes of the present application, $r_t$ may comprise online content relevance. For purposes of the present application, $r_{it}$ may comprise online content relevance (e.g., engagement) for member i for online content item t (e.g., a post). In an embodiment, relevance of online content item 1 for member 1 may have a same or similar value as relevance of online content item 1 for member 2. In addition, relevance of online content item 2 for member 1 may have a same or similar value as relevance of online content item 2 for member 2. In an embodiment, relevance for online content item 1 may be greater than relevance for online content item 2 so a recommendation system may recommend online content item 1 to both members. In an embodiment, online content $t_1$ may be recommended to member 1 and member 2, and member 1 may retransmit $t_1$ so that member 2 receives two copies of $t_1$ (one copy via recommendation and one copy via retransmission). Thus, a combined relevance may be $2r_1$.

In another embodiment, a recommender system may assume online content may be retransmitted. In an embodiment, for example, online content $t_1$ may be recommended to member 1, online content $t_2$ may be recommended to member 2, and online content $t_1$ may be retransmitted (e.g., reposted) to member 2. In an illustrative embodiment, member 2 may therefore receive two relevant online content items. Thus, a combined relevance for a social network comprising member 1 and member 2 is $2r_1+r_2$, which is greater than $2r_1$, above. Accordingly, a recommender system embodiment which takes into account social network diffusion of online content may potentially improve a relevance of online content viewed by members. Further, member engagement may be potentially increased.

In another embodiment, assume an illustrative social network comprises five users and five online content items are available for recommendation. As mentioned previously, members and users may be used interchangeably with regard to social networks, in this embodiment, for example, users 2 and 3 may be associated with (e.g., "follows") user 1. Users 4 and 5 may be associated with (e.g., "follows") user 3. FIG. 2A is a schematic diagram of a social network graph 200 comprising five users accordingly to an embodiment. In an illustrative embodiment, for example, a relevant online content item (e.g., post or tweet) may be recommended and/or assigned to a user and a recommended and/or assigned online content item may be retransmitted (e.g., re-posted or retweeted) to a member that is associated with (e.g., "follows", is "friends" with) another user. In this example embodiment, for example, relevance (e.g., engagement weight) of online content $t_1$, $t_2$, $t_3$, $t_4$, and $t_5$ (e.g., posts or tweets) for a user may be assigned as follows:

User 1 (relevance of $t_1$, $t_2$, $t_3$, $t_4$, and $t_5$) (0.9, 0.1, 0.3, 0.7, 0.4)

User 2 (0.8, 0.6, 0.4, 0.3, 0.5)

User 3 (0.5, 0.7, 0.2, 0.1, 0.9)

User 4 (0.4, 0.8, 0.7, 0.1, 0.3)

User 5 (0.7, 0.1, 0.5, 0.7, 0.4)

Continuing with the illustrative embodiment, a recommender system may assign a highest relevant post to a user. Thus, as highlighted in bold above, a recommender system embodiment may recommended online content $t_1$ 205 to user 1 210, online content $t_1$ 205 may be recommended to user 2 220, online content $t_5$ 206 may be recommended to user 3 230, online content $t_2$ 207 may be recommended to user 4 240, and online content $t_1$ 205 may be recommended to user 5 250. In an embodiment, a recommender system may calculate combined relevance by adding relevance of recommended online content and relevance or retransmissions of online content (e.g., posts and reposts). Therefore, for FIG. 2A, a combined relevance for users may be identified as follows:

User 1 210=0.9;

User 2 220=0.8 (note that although user 2 received $t_1$ 205 via recommendation and retransmission, it is counted once)

User 3 230=1.4 ($t_1$ 205 through retransmission+$t_5$ 206 through recommendation)

User 4 240=1.2 ($t_1$ 205 through retransmission+$t_2$ 207 through recommendation)

User 5 250=0.7 ($t_1$ 205 through recommendation and retransmission).

Thus, a combined relevance of online content for user 1 210, user 2 220, user 3 230, user 4 240, and/or user 5 250 above is 5.0 by adding relevance of online content for user 1 210, user 2 220, user 3 230, user 4 240, and/or user 5 250.

In an alternative embodiment, a recommendation system may take into consideration online content diffusion and/or relevance of online content. In an illustrative embodiment, a recommendation system may exclude or omit online content (e.g., posts) from being recommended to users if the online content a) has been previously assigned to users and/or b) may reach a user through retransmissions (e.g., re-posts, retweets).

Figure 2A:
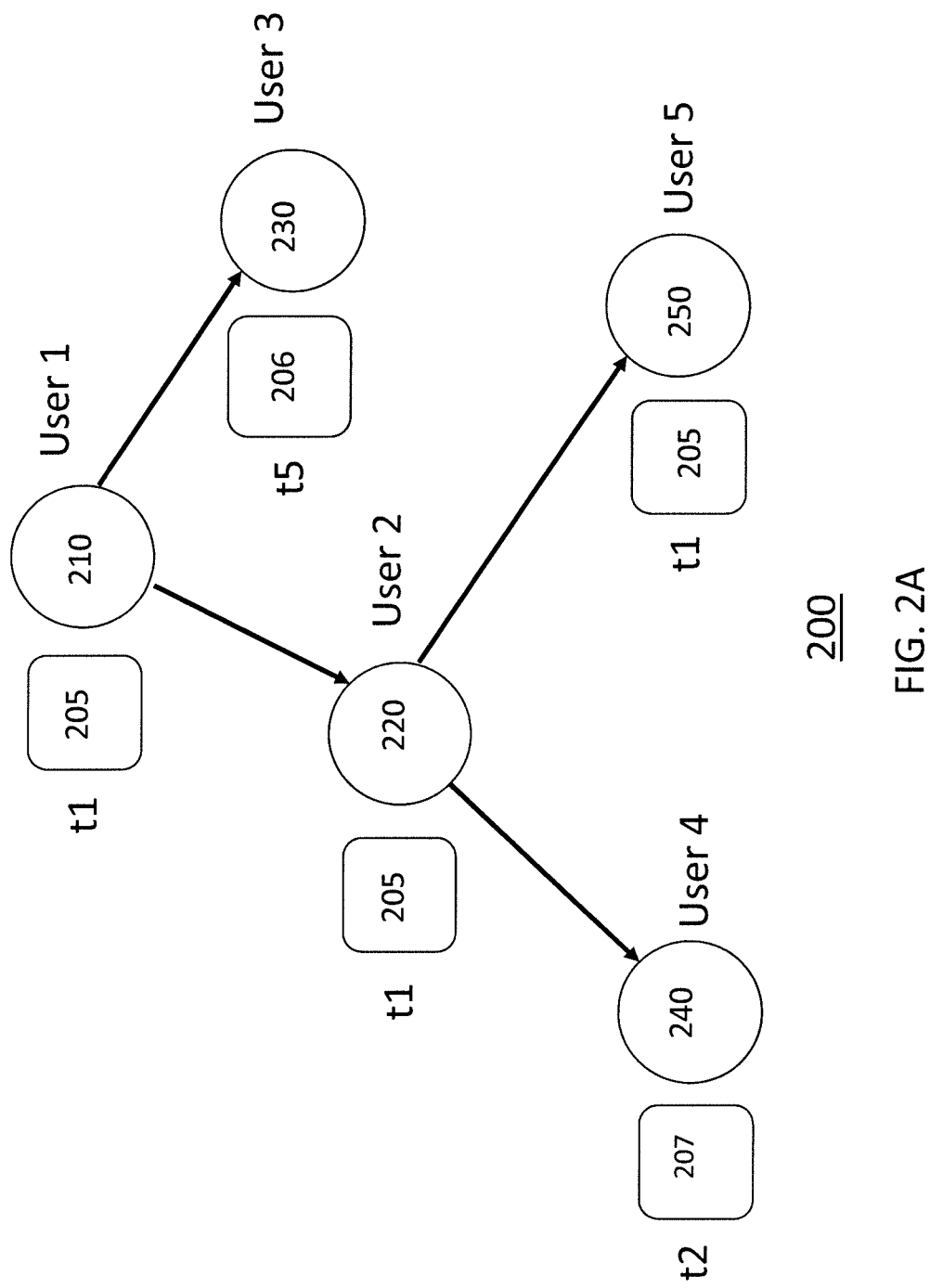
FIG. 2A is a schematic diagram of another social network graph according to another embodiment.
Figure 2B:
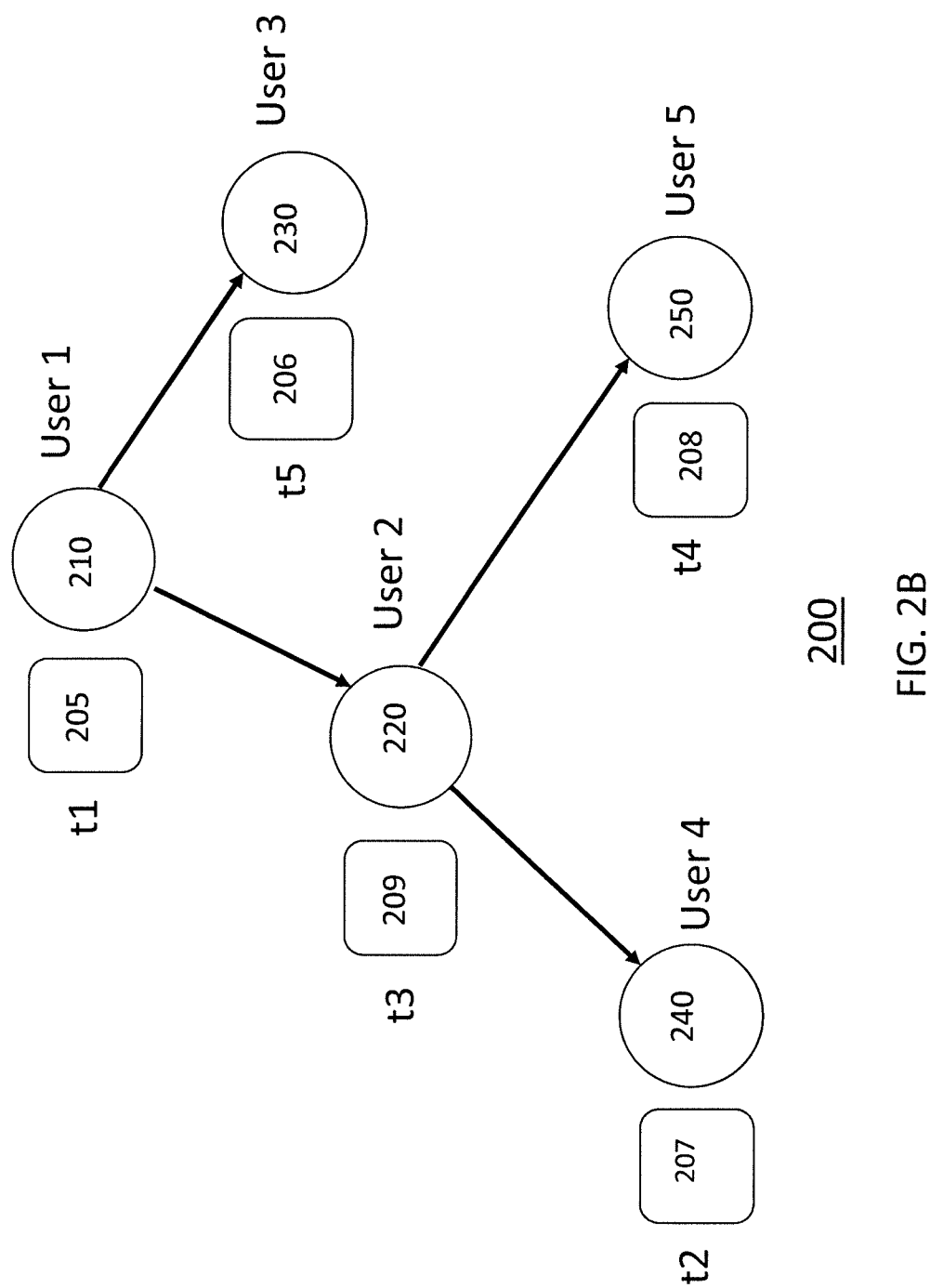
FIG. 2B is the schematic block diagram of a social network graph of FIG. 2A.

FIG. 2B is the schematic block diagram of a social network 200 of FIG. 2A. In an embodiment, a recommender system may assign online content $t_1$ 205 to user 1 210. In an embodiment, online content $t_1$ 205 may reach users 2 220 through 5 250 through retransmissions, which results in a combined relevance of 3.3 (0.9+0.8+0.5+0.4+0.7) for user 1 210. In an embodiment, a recommender system embodiment may assign user 2 220 a next relevant online content item (e.g., post $t_3$ 209), which may also be retransmitted (e.g., re-posted to user 4 240 and user 5 250), and this results in a combined relevance rating of 1.6 (0.4+0.7+0.5) for user 2 220. Continuing, a recommender system embodiment may assign user 3 230 a next relevant online content item (e.g., post) that user 3 230 has not already received through retransmission (e.g., repost), which may be $t_5$ 206, and this leads to a relevance rating of 0.9 for user 3 230. Continuing, a recommender system embodiment may assign user 4 240 a next relevant online content item (e.g., post) that user 4 240 has not received through retransmission which may be $t_2$ 207 (e.g., $t_1$ 206 and $t_3$ 209 have been received through retransmission) and this leads to a relevance rating of 0.8 for user 4 240. Continuing with this illustrative embodiment, a recommender system may assign user 5 250 a next relevant online content item that user 5 250 has not received through retransmission, which is $t_4$ 208 and this leads to user 5 250 having a relevance of 0.7. In an embodiment, a recommendation system may calculate a combined relevance for a social network graph 200 comprising five users, as is illustrated, for example, in FIG. 2B, by adding relevance values for each user to result in a combined relevance of 7.3. Here, a combined relevance of 7.3 is an increase of 46% over the previously disclosed recommender system embodiment that did not take into consideration social network diffusion of online content.

In an embodiment utilizing social network Tumblr, a set of 1.5 million users was sampled, and public online content (e.g., posts) were searched and/or reviewed. In an embodiment, a recommender system determined or calculated repost probability. Continuing with an illustrative embodiment, a recommender system generated social network graphs for a set of users. A recommender system identified a set of users that were reachable from a source node with a known probability and a recommender system computed and/or estimated a probability of reposts. In an embodiment, a recommender system generated member engagement utilizing a diffusion process, such as an embodiment described herein, and compared member engagement to a content type recommender system (e.g., a system where a member's history and personalization may be utilized), and/or also an existing Tumblr recommendation system. Table 4, below, provides results of such as comparison and illustrates how a recommender system embodiment utilizing a diffusion process embodiment outperformed a content type recommender system and/or an existing Tumblr recommendation system. Table 4 illustrates that an average member engagement for a recommendation system embodiment using a diffusion process embodiment increases from 129% improvement to 177% improvement to 191% improvement as a number of recommended online content items (e.g., posts) increase or as recommendation online content/post threshold values increases. In an embodiment, a recommender system embodiment utilizing a diffusion process embodiment may more efficiently exploit recommendation system resources better by omitting, from recommendation, online content that may more likely than not reach members from other sources. In an embodiment, a recommender system utilizing a diffusion process embodiment may recommend different online content, which may potentially be more relevant to a member and thus may increase member engagement.

| K | 1 | 5 | 10 | 15 | 20 | 25 |
|---|---|---|----|----|----|----|
| Content | 2444 | 2368 | 2298 | 2242 | 2196 | 2156 |
| Social | 4395 | 4117 | 3912 | 3753 | 3619 | 3498 |
| Real | 3385 | 3395 | 3404 | 3399 | 3398 | 3398 |
| DiffRec | 10080 | 11414 | 10831 | 10504 | 10421 | 10185 |
|  | +129% | +177% | +177% | +180% | +188% | +191% |

Figure 3:
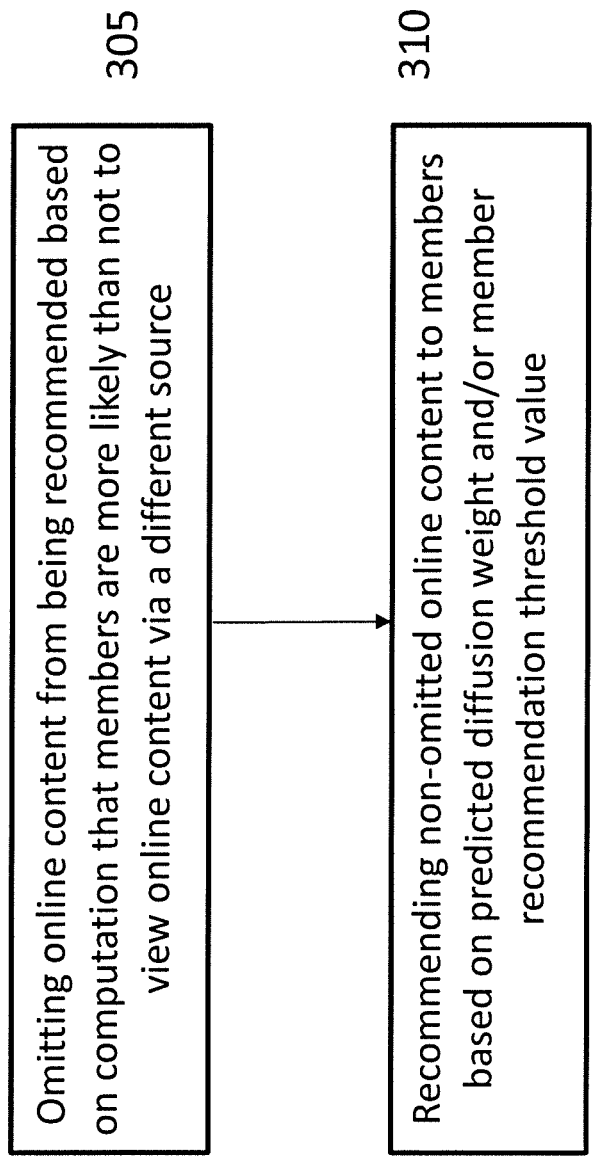
FIG. 3 is a flow chart of a recommendation process according to an embodiment.

Thus, in an embodiment, a recommendation system may generate recommendations that account for online content diffusion in a social network. FIG. 3 is a flow diagram of an embodiment of a process to generate a recommendation list of online content. Of course, embodiments are intended to be illustrative examples rather than be limiting with respect to claimed subject matter. Likewise, for ease of explanation, an embodiment may be simplified to illustrate aspects and/or features in a manner that is intended to not obscure claimed subject matter through excessive specificity and/or unnecessary details. Embodiments in accordance with claimed subject matter may include all of, less than, or more than blocks 305-310. Also, the order of blocks 305-310 is merely as an example order.

Referring to FIG. 3, at block 305, a recommendation system may omit online content from being recommended to one or more members in an online social network, based at least in part, on a computation that one or more members are more likely than not to view online content via a different source. In an illustrative embodiment, for example, the computation may be based, at least in part, on a prediction or calculation of diffusion of online content through a social network. Continuing with this embodiment, a prediction or calculation of diffusion may be based on one or more of the following factors: online content retransmission probability; a number of successive retransmissions; distance from an online content source location in a social network graph; and/or relevance of online content to a member. At block 310, in an embodiment, a recommender system may recommend online content to members based, at least in part, on predicted diffusion weight of online content. Continuing with this illustrative embodiment, a recommender system may recommend online content to members until recommendation slots are filled, and/or a recommendation threshold value is reached. For example, in an embodiment, a recommender system may allot member y with space (e.g., recommendation slots) for two online content recommendations and the recommender system may recommend up to two online content items.

Figure 4:
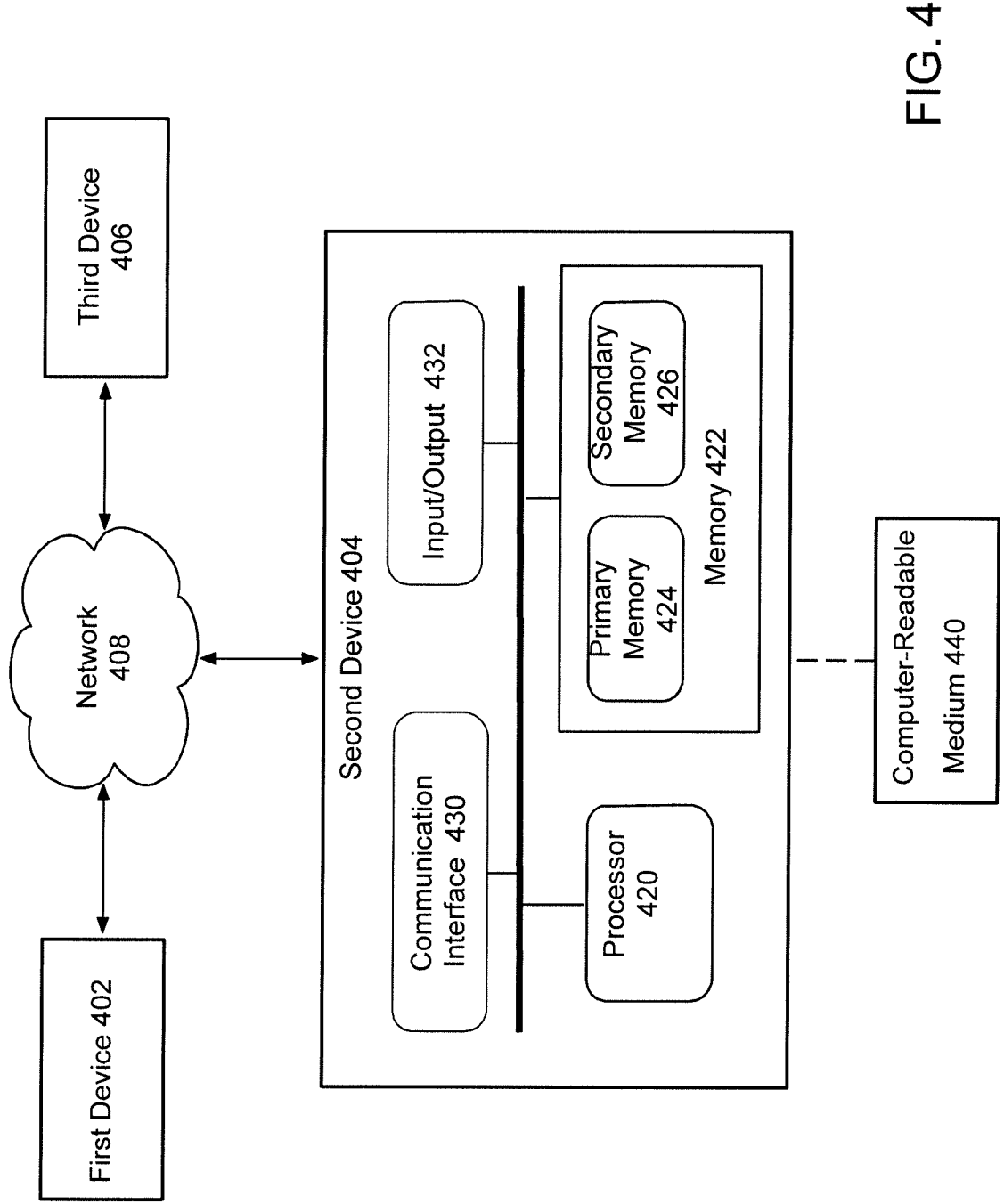
FIG. 4 is a schematic diagram illustrating a computing environment according to an embodiment.

For purposes of illustration, FIG. 4 is an illustration of an embodiment 400 of a system that may be employed in a client-server type interaction, such as described infra, in connection with rendering a GUI via a device, such as a network device and/or a computing device, for example, a client computing device, such as 402, may comprise a mobile computing device with a processor. A mobile computing device may include executable instructions stored in a memory. Stored instructions may be executable, such as by a computing device, as previously suggested. For example, a user may use a device, such as 402, to login to a social network, such as Facebook, Tumblr, Twitter, Weibo, and Instagram. In order to increase the user's engagement with the social network and recommend relevant posts, instructions may be stored locally and executable to omit, from being recommended, to one or more users in an online social network based at least in part on an estimate that the one or more users are more likely than not to view the online content via a different source. In addition, instructions may be stored locally to further comprising recommending non-omitted online content to users based, at least in part, on predicted diffusion weight of the online post. Alternately, electronic signal transmissions may be initiated across a network, such as 408, to a second device, such as 404, which may comprise a server. Thus, server 404, for example, may include stored executable instructions to generate a route recommendation that may be communicated back to device 402, for example. It is, of course, noted that device 404 may comprise more than one server as well.

In an illustrative example, In FIG. 4, computing device 402 ('first device' in figure) may interface with client 404 ('second device' in figure), which may comprise features of a client computing device, for example. Communications interface 430, processor (e.g., processing unit) 420, and memory 422, which may comprise primary memory 424 and secondary memory 426, may communicate by way of a communication bus, for example. In FIG. 4, client computing device 402 may represent one or more sources of analog, uncompressed digital, lossless compressed digital, and/or lossy compressed digital formats for content of various types, such as video, imaging, text, audio, etc. in the form physical states and/or signals, for example. Client computing device 402 may communicate with computing device 404 by way of a connection, such as an internet connection, via network 408, for example. Although computing device 404 of FIG. 4 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter be limited in scope to illustrative examples.

Memory 422 may be representative of any storage mechanism. Memory 420 may comprise, for example, primary memory 422 and secondary memory 426, additional memory circuits, mechanisms, or combinations thereof may be used. Memory 420 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 420 may be utilized to store a program. Memory 420 may also comprise a memory controller for accessing computer readable-medium 440 that may carry and/or make accessible content, which may include code, and/or instructions, for example, executable by processor 420 and/or some other unit, such as a controller and/or processor, capable of executing instructions, for example.

Under direction of processor 420, memory, such as memory cells storing physical states, representing, for example, a program, may be executed by processor 420 and generated signals may be transmitted via the Internet, for example. Processor 420 may also receive digitally-encoded signals from client computing device 402.

Network 408 may comprise one or more network communication links, processes, services, applications and/or resources to support exchanging communication signals between a client computing device, such as 402, and computing device 406 ('third device' in figure), which may, for example, comprise one or more servers (not shown). By way of example, but not limitation, network 408 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 404, as depicted in FIG. 4, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD)

players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 422 may store cookies relating to one or more users and may also comprise a computer-readable medium that may carry and/or make accessible content, including code and/or instructions, for example, executable by processor 420 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A computer-implemented method for a recommendation system, comprising:

identifying a first user in an online social network as a source of online content, the online social network being represented by a social network graph including a plurality of nodes, each of the nodes in the plurality of nodes representing a corresponding one of a plurality of users in the online social network, the first user corresponding to a first node of the plurality of nodes in the social network graph;

identifying a set of nodes of the plurality of nodes in the social network graph, each of the nodes in the set of nodes being connected, directly or indirectly, to the first node via one or more edges of the social network graph, each of the edges in the one or more edges representing a relationship or interaction between two different users of the plurality of users, the two different users corresponding to two different nodes of the set of nodes;

predicting diffusion of the online content in the online social network from the first node;

determining, for each of the nodes in the set of nodes, a probability that a corresponding user of the plurality of users will receive the online content from one or more sources different than the recommendation system based, at least in part, on the diffusion of the online content in the online social network;

determining, for each of the nodes in the set of nodes, an engagement weight that represents a likelihood of further diffusion of the online content in the online social network from the corresponding node;

deciding not to recommend the online content to a second user of the plurality of users in the online social network based, at least in part, on the probability determined for a second node in the set of nodes being higher than a first threshold, the second node in the set of nodes corresponding to the second user, wherein the probability determined for the second node is indicative of the second user likely receiving the online content from at least one source different than the recommendation system; and recommending the online content to a third user of the plurality of users in the online social network based, at least in part, on the engagement weight determined for a third node in the set of nodes being higher than a second threshold and the probability determined for the third node being lower than the first threshold, the third node in the set of nodes corresponding to the third user, wherein the probability determined for the third node is indicative of the third user likely not receiving the online content from a source different than the recommendation system, wherein at least one of:
- predicting diffusion of the online content in the online social network is based, at least in part, on the nodes in the set of nodes having corresponding path lengths from the first node that are less than a threshold repost distance;
- predicting diffusion of the online content in the online social network is based, at least in part, on the nodes in the set of nodes having corresponding retransmission probabilities greater than a threshold retransmission probability;
- the engagement weight for the third node being higher than the second threshold is based, at least in part, on the third user exhibiting higher online content diffusion relative to one or more other users; or
- recommending the online content to the third user is based, at least in part, on a specified maximum number of recommended online content items for the third user not being exceeded.

2. The method of claim 1, wherein the online content comprises at least one of a product description; or a service description.

3. The method of claim 1, wherein the online content comprises an advertisement.

4. The method of claim 1, wherein predicting diffusion of the online content in the online social network is based, at least in part, on the nodes in the set of nodes being reachable from the first node in a majority of social network graphs.

5. The method of claim 1, wherein the online content comprises a video.

6. The method of claim 1, wherein the online content comprises an image.

7. The method of claim 1, wherein the online content comprises a web page.

8. The method of claim 1, wherein the probability for the second node being higher than the first threshold is based, at least in part, on the second user having a higher number of linked neighbors relative to other users.

9. The method of claim 1, wherein the online content comprises an article.

10. The method of claim 1, at least a portion of the edges representing a relationship or interaction between the first user represented by the first node and another one of the plurality of users represented by a corresponding one of the set of nodes.

11. The method of claim 1, wherein identifying a set of nodes of the plurality of nodes in the social network graph comprises:
- identifying nodes that are directly connected to the first node such that the set of nodes consists of the nodes that are directly connected to the first node.

12. The method of claim 1, wherein identifying a set of nodes of the plurality of nodes in the social network graph comprises:
- identifying nodes that are indirectly connected to the first node such that the set of nodes consists of the nodes that are indirectly connected to the first node.

13. A system, comprising one or more computing devices comprising a processor, wherein the one or more computing devices are configured to:
- identify a first user in an online social network as a source of online content, the online social network being represented by a social network graph including a plurality of nodes, each of the nodes in the plurality of nodes representing a corresponding one of a plurality of users in the online social network, the first user corresponding to a first node of the plurality of nodes in the social network graph;
- identify a set of nodes of the plurality of nodes in the social network graph, each of the nodes in the set of nodes being connected, directly or indirectly, to the first node via one or more edges of the social network graph, each of the edges in the one or more edges representing a relationship or interaction between two different users of the plurality of users, the two different users corresponding to two different nodes of the set of nodes;
- predict diffusion of the online content in the online social network from the first node;
- for each of the nodes in the set of nodes, determine a probability that a corresponding user of the plurality of users will receive the online content from one or more sources different than a recommendation system based, at least in part, on the diffusion of the online content in the online social network;
- for each of the nodes in the set of nodes, determine an engagement weight that represents a likelihood of further diffusion of the online content in the online social network from the corresponding node;
- decide not to recommend the online content to a second user of the plurality of users in the online social network based, at least in part, on the probability determined for a second node in the set of nodes being higher than a first threshold, the second node in the set of nodes corresponding to the second user, wherein the probability determined for the second node is indicative of the second user likely receiving the online content from at least one source different than the recommendation system; and
- recommend the online content to a third user of the plurality of users in the online social network based, at least in part, on the engagement weight determined for a third node in the set of nodes being higher than a second threshold and the probability determined for the third node being lower than the first threshold, the third node in the set of nodes corresponding to the third user, wherein at least one of:
- the one or more computing devices are configured to predict diffusion of the online content in the online social network is based, at least in part, on the nodes in the set of nodes having corresponding path lengths from the first node that are less than a threshold repost distance;
- the one or more computing devices are configured to predict diffusion of the online content in the online social network is based, at least in part, on the nodes in the set of nodes having corresponding retransmission probabilities greater than a threshold retransmission probability;
- the engagement weight for the third node being higher than the second threshold is based, at least in part, on the third user exhibiting higher online content diffusion relative to one or more other users; or
- the one or more computing devices are configured to recommend the online content to the third user is based, at least in part, on a specified maximum number of recommended online content items for the third user not being exceeded.

14. The system of claim 13, wherein the online content comprises at least one of a product description; or a service description.

15. The system of claim 13, wherein the online content comprises an advertisement.

16. The system of claim 13, wherein the online content comprises a video.

17. The system of claim 13, wherein the one or more computing devices are configured to predict diffusion of the online content in the online social network based, at least in part, on the nodes in the set of nodes being reachable from the first node in a majority of social network graphs.

18. The system of claim 13, wherein the online content comprises an image.

19. The system of claim 13, wherein the online content comprises a web page.

20. The system of claim 13, wherein the online content comprises an article.

21. The system of claim 13, wherein the probability for the second node being higher than the first threshold is based, at least in part, on the second user having a higher number of linked neighbors relative to other users.

22. A non-transitory computer readable medium comprising instructions that when executed by a processor perform actions, the actions comprising:

identifying a first user in an online social network as a source of online content, the online social network being represented by a social network graph including a plurality of nodes, each of the nodes in the plurality of nodes representing a corresponding one of a plurality of users in the online social network, the first user corresponding to a first node of the plurality of nodes in the social network graph;

identifying a set of nodes of the plurality of nodes in the social network graph, each of the nodes in the set of nodes being connected, directly or indirectly, to the first node via one or more edges of the social network graph, each of the edges in the one or more edges representing a relationship or interaction between two different users of the plurality of users, the two different users corresponding to two different nodes of the set of nodes;

predicting diffusion of the online content in the online social network from the first node;

determining, for each of the nodes in the set of nodes, a probability that a corresponding user of the plurality of users will receive the online content from one or more sources different than a recommendation system based, at least in part, on the diffusion of the online content in the online social network;

determining, for each of the nodes in the set of nodes, an engagement weight that represents a likelihood of further diffusion of the online content in the online social network from the corresponding node;

deciding not to recommend the online content to a second user of the plurality of users in the online social network based, at least in part, on the probability determined for a second node in the set of nodes being higher than a first threshold, the second node in the set of nodes corresponding to the second user; and recommending the online content to a third user of the plurality of users in the online social network based, at least in part, on the engagement weight determined for a third node in the set of nodes being higher than a second threshold and the probability determined for the third node being lower than the first threshold, the third node in the set of nodes corresponding to the third user, wherein the probability determined for the third node is indicative of the third user likely not receiving the online content from a source different than the recommendation system, wherein at least one of:

predicting diffusion of the online content in the online social network is based, at least in part, on the nodes in the set of nodes having corresponding path lengths from the first node that are less than a threshold repost distance;

predicting diffusion of the online content in the online social network is based, at least in part, on the nodes in the set of nodes having corresponding retransmission probabilities greater than a threshold retransmission probability;

the engagement weight for the third node being higher than the second threshold is based, at least in part, on the third user exhibiting higher online content diffusion relative to one or more other users; or recommending the online content to the third user is based, at least in part, on a specified maximum number of recommended online content items for the third user not being exceeded.

* * * * *